United States Patent Office 2,975,397
Patented Mar. 14, 1961

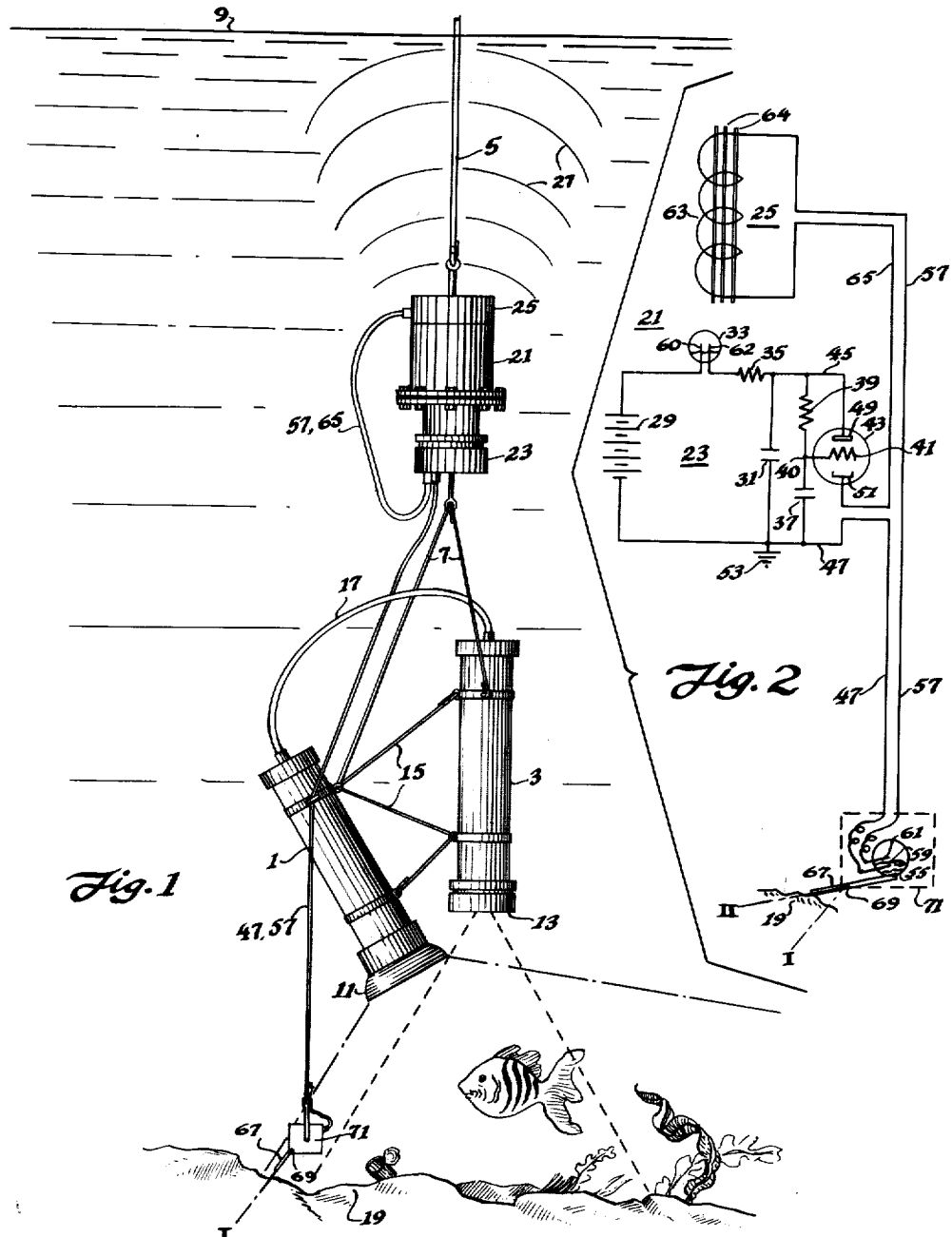

2,975,397

SURFACE-INDICATING APPARATUS

Harold E. Edgerton, Belmont, Mass., assignor to Edgerton Germeshausen & Grier, Inc., Boston, Mass., a corporation of Massachusetts Filed June 6, 1955, Ser. No. 513,377

3 Claims. (Cl. 340—5)

The present invention relates to apparatus for indicating the presence of a remote surface or object and, more particularly, for indicating the location of the bottom of a body of water.

It is sometimes necessary when submerging apparatus of various types in the ocean or in some other body of water to indicate when that apparatus has arrived at the bottom or at a predetermined distance from the bottom. This is important, for example, in underwater photographic exploration, such as the hereinafter discussed flash-photography exploration described in my co-pending application, Serial No. 437,647, filed June 18, 1954, for Underwater Flash-Producing System, now Patent No. 2,872,622.

Various techniques have been utilized in the past for indicating the bottom, including the use of sounding lines and sonar bottom-ranging equipment. The sounding lines, however, are not reliable particularly where strong underwater currents prevail, and the sonar-ranging equipment is not only extremely costly, but it is awkward to manipulate, its indications are often difficult to interpret, and it requires the employment of highly trained personnel.

An object of the present invention, therefore, is to provide a new and improved bottom-indicating apparatus that shall not be subject to any of these difficulties and that, to the contrary, is the essence of simplicity and reliability.

A further object is to provide apparatus that may be more generally used for indicating to a remote point the presence of other types of surfaces or objects as well.

An additional object is to provide such a novel apparatus that shall be particularly well-suited for use with underwater photographic equipment. In summary, the invention, in preferred form, resides in transmitting a signal to a remote point while moving toward a predetermined surface, such as the ocean bottom, simultaneously exploring to touch that surface, and, upon touching the surface, terminating the transmission of the signal. Preferred techniques and apparatus are later treated in detail.

Other and further objects will be explained hereinafter and will be more particularly pointed out in the appended claims.

The invention will now be described in connection with the accompanying drawing Fig. 1 of which is a side elevation illustrating the invention as applied to a bottom indicator; and Fig. 2 is a schematic circuit diagram of a preferred electrical circuit for use in the system of Fig. 1.

While the invention will now be described in connection with its preferred application to underwater photographic equipment, it is to be understood that this is by way of illustration and that, as before stated, the invention may be utilized in other applications to indicate to a remote point the presence of a surface or object. In Fig. 1, therefore, a light-flash-producing apparatus 1, strapped or otherwise secured, as at 15, to a camera 3, is shown being lowered by cables 5 and 7 below the surface 9 of the water from a ship or other vessel, not shown. The flash-producing apparatus 1 and the camera 3 may be of any desired type, properly water-proofed and adapted to withstand underwater pressures. As an example, they may be of the type described in the said copending application embodying a sealed light reflector 11 at the lower end of the tubular housing 1 containing the flash-producing apparatus, and a sealed camera window 13 disposed at the bottom of the tubular camera housing 3. The camera 3, as discussed in the said application, may be adapted to expose successive portions of a continuous film through synchronization, provided by means of the electric cable 17, with the production of timed light flashes from the flash-producing apparatus 1.

It is essential for many uses of such flash-photography apparatus, as well as for the use of other underwater equipment, to have a mechanism for informing the ship or vessel at the remote location above the surface 9 of the water when the apparatus 1, 3 has been lowered to the bottom 19 or to a predetermined distance from the bottom 19. This indication must be accurate, substantially instantaneous, automatic and independent of water currents and other disturbances. It must be effected, moreover, with a safeguard against the apparatus striking or dragging along the bottom.

In accordance with the present invention, this indication is provided by sound impulses generated by a sound transmitter 21 interposed between the cables 5 and 7. The sound transmitter 21 preferably comprises, within its water-tight casing, an electrical pulse-producing apparatus 23 and an electrical energy-to-sound energy transducer 25 disposed to send acoustic energy signals, indicated by the sound wave fronts 27, up toward the water surface 9 in order that it may be received in the beforementioned ship or other vessel, not shown. A preferred electrical pulse-producing apparatus 23 is shown in Fig. 2 comprising a relaxation oscillator employing a source of direct-current 29, such as a battery, for charging a main condenser 31 through a mercury switch or similar device 33 and a charging impedance, such as a resistor 35. The battery or other source 29 at the same time also charges a second condenser 37 through the mercury switch 33, the impedance 35 and a further impedance, such as a resistor 39. The junction 40 between the second condenser 37 and the resistor 39 is connected to the control or trigger grid electrode 41 of a gaseous-discharge tube 43, such as a thyratron or the like. The upper electrode of the condenser 31 is connected by a conductor 45 to the anode 49 of the tube 43. The lower electrode of the condenser 31 is preferably connected to a reference point, such as the chassis of the equipment, indicated by the ground connection 53, and by a conductor 47 to an electrode 59 of a second mercury or similar switch 55. A further connection 57 is provided from the other electrode 61 of the switch 55 to the upper end of a winding 63 of the transducer 25. The lower end of the winding 63 is connected by a conductor 65 to the cathode 51 of the gaseous-discharge tube 43. The conductors 47, 57 and 65 are enclosed in water-tight insulation or other coverings. Disposed within the winding 63 of the transducer 25 may be a plurality of nickel or other magnetostrictive or magnetomotive elements schematically illustrated at 64 that may be vibrated by the energization of the winding 63 to produce sound energy, as is well-known. The elements 64 may be associated with a metal diaphragm, not shown, to drive the same, if desired. Any other conventional underwater transducer may similarly be employed.

The mercury or similar switch 33 is mounted so that, when the apparatus 21 is in the position shown in Fig. 1, it closes the circuit between the mercury switch electrodes 60 and 62 and hence between the battery 29 and the resistor 35. When the apparatus 21 is stored above water and rested on its side, however, the mercury of the switch 33 will not provide a connection between the electrodes 60 and 62 so that the battery 29 is ineffective to operate the circuit 23 and it does not accordingly run down. A manual or other type of switch may, of course, also be employed, but the mercury switch provides an automatic turn-on of the equipment 21 when the equipment is oriented in its operative position.

In operation, when the second condenser 37 has charged to a voltage sufficient to trigger the tube 43 between the control grid electrode 41 and the cathode 51, the charged condenser 31 will discharge through the tube 43 between the anode 49 and the cathode 51. The discharge circuit may be traced from the upper electrode of the condenser 31 by way of conductor 45 to the anode 49, through the tube 43 to the cathode 51, through conductor 65 and the winding 63, through conductor 57 and the mercury switch 55 to conductor 47, and thence to the lower electrode of the condenser 31. The winding 63 becomes thus energized to move the sound-producing elements 64 and thus to produce a sound-wave vibration signal 27. When the condenser 31 has thus discharged through the winding 63 and the tube 43, the tube 43 stops conducting and the winding 63 becomes de-energized, terminating the sound-wave vibration signal. The process of re-charging the condensers 31 and 37 then recommences until a further energization of the winding 63 takes place upon the next-following condenser discharges. Successive signal impulses of sound are thus transmitted automatically upward while the apparatus 1, 3, 21 is being lowered into the water, the recurrence frequency of the signals being adjustable by adjusting the time constants of the charging circuits before described, such as by varying the value of the impedances 35 and 39.

At the end of the conductors 47 and 57 where the mercury or other position-operated switch 55 is disposed, a feeler or probe 67 is provided. This probe 67 may be pivotable about an axis 69 and may carry, within an enclosure 71, the mercury switch 55. The probe 67 is suspended by the conductors 47 and 57 any desired distance below the apparatus 1, 3 to explore for the bottom 19. When the apparatus 1, 3 is being lowered, the probe 67 may be so adjusted that it assumes the position along the direction I, in which position the mercury of the switch 55 makes contact between the electrodes 59 and 61 to permit the transmission of the sound-wave signals, as above discussed. When, however, the probe 67 touches the bottom 19, it will be pivoted along the direction II, Fig. 2, tilting the mercury or other position-operated switch 55 and opening the circuit between the electrodes 59 and 61. The connections at the electrodes 59 and 61 are preferably flexible, as illustrated. The winding 63 of the transducer 25 is thus then disconnected from the discharge circuit of the condenser 31 and the transmitter 21 becomes entirely inoperative, terminating the sound-wave signals. Upon noting such termination, the personnel in the ship or other vessel, not shown, will stop paying out cable 5 and the apparatus 1, 3 is known to be in the desired position relative to the bottom 19. If the ship or vessel is in motion or the tide is running, the probe 67 will be maintained in substantially the position II as it scrapes along the bottom 19. When the depth of the bottom increases by a sufficient amount, the sound signals will again be transmitted, notifying the operators on the shop to pay out more cable 5. In order further to avoid damaging the apparatus 1 and 3 by its striking the bottom or dragging therealong, the length of the conductors 47, 57 may be adjusted to provide for the known or suspected bottom variations which usually are, in fact, previously surveyed by sonar equipment.

While the invention has been explained in terms of automatically terminating signal transmissions upon the reaching of the bottom 19, it is obvious that the reverse conditions may easily be obtained; that is, the switch 55 may be oriented so that it opens the circuit when the exploration probe 67 is in direction I, and closes the same when in position II. In such event, the transmitter 21 will normally be in its inoperative state, and will assume the operative or signal-transmitting state when the bottom 19 has been reached.

Other types of energy transmitters may, of course, be utilized in connection with the present invention and further modifications will occur to those skilled in the art. All such are considered to fall within the scope of the invention as defined in the appended claims.

What is claimed is:

1. Apparatus for revealing the proximity of the bottom of a body of water, comprising an acoustic wave signal transmitting means suspended from a cable and movable toward said bottom through said water, said transmitting means having an acoustic wave generator acoustically coupled to said water and having two operational states, in at least one of which acoustic waves are propagated through the water as freely expanding wavefronts directed toward the surface of the body of water, probing means physically separate from the transmitting means, said probing means being suspended by a cable from said transmitting means and located between said bottom and the transmitting means, said probing means being movable with said transmitting means toward said bottom, said probing means including an exposed probe element and an electric switch actuated by said probe element and having a first operational state when said probe element is separated from said bottom and a second operational state when said probe element reaches said bottom, and means operatively coupling said electric switch and said transmitting means, said transmitting means changing its operational state in response to a change in operational state of said electric switch.

2. The apparatus of claim 1, said generator comprising an electric oscillator driving an acoustic vibration transducer.

3. The apparatus of claim 1, said generator comprising a relaxation oscillator including a gaseous discharge device, and said electric switch being a position-sensitive mercury switch.

References Cited in the file of this patent

UNITED STATES PATENTS

| | | |
|---|---|---|
| 768,572 | Mundy | Aug. 23, 1904 |
| 2,019,059 | Sherman | Oct. 29, 1935 |
| 2,124,497 | Slauson | July 19, 1938 |
| 2,131,993 | Wittkuhns et al. | Oct. 4, 1938 |
| 2,250,708 | Herz | July 29, 1941 |
| 2,285,809 | Davis | June 9, 1942 |
| 2,293,949 | Potter | Aug. 25, 1942 |
| 2,320,863 | Green | June 1, 1943 |
| 2,346,093 | Tolson | Apr. 4, 1944 |
| 2,361,064 | Schlumberger | Oct. 24, 1944 |
| 2,496,639 | Richardt et al. | Feb. 7, 1950 |
| 2,507,986 | Liss | May 16, 1950 |
| 2,547,875 | Krasnow | Apr. 3, 1951 |
| 2,567,229 | Morse | Sept. 11, 1951 |